Patented May 28, 1929.

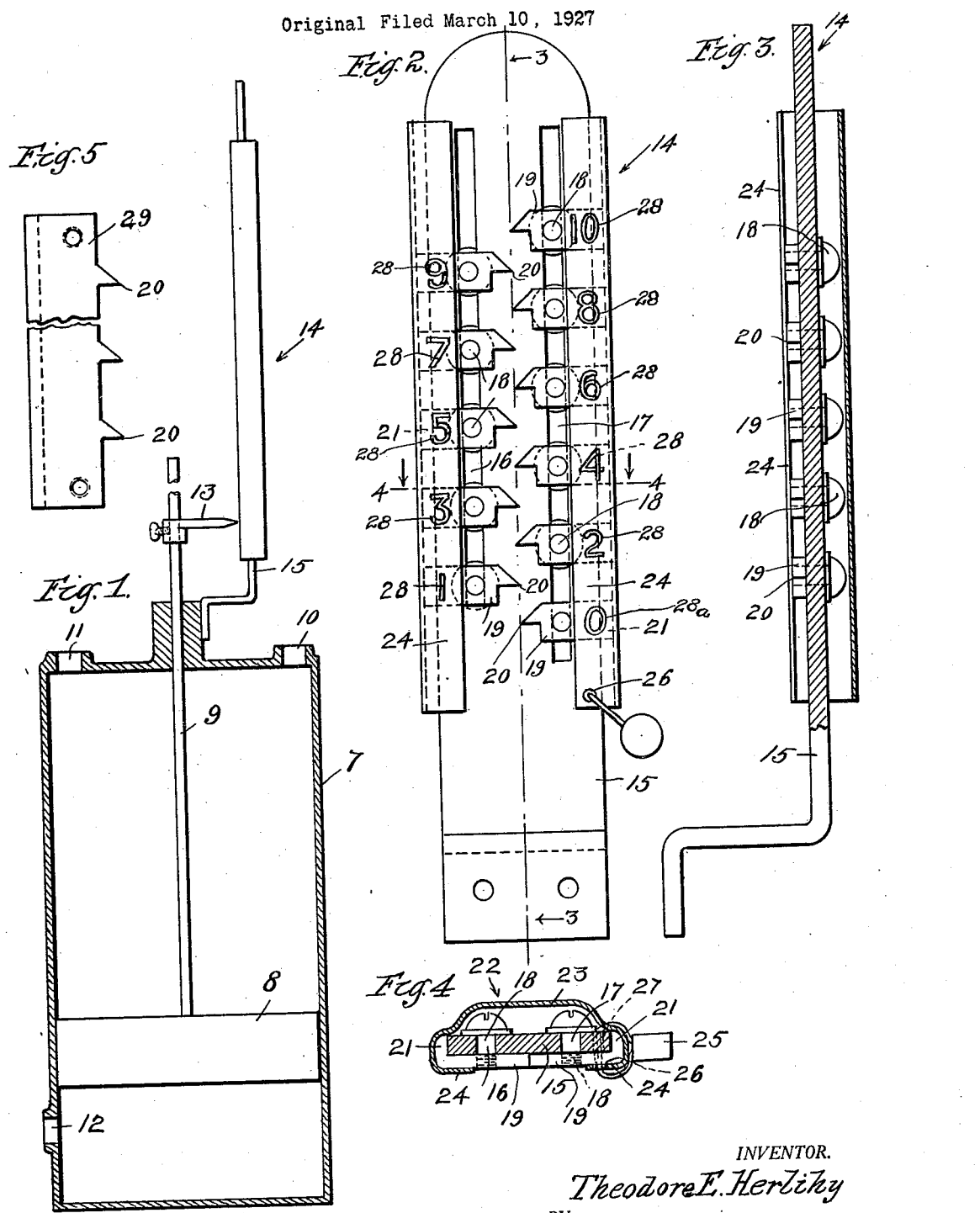

1,714,782

UNITED STATES PATENT OFFICE.

THEODORE E. HERLIHY, OF LOS ANGELES, CALIFORNIA.

GAUGE.

Application filed March 10, 1927, Serial No. 174,248. Renewed January 21, 1929.

This invention relates to gauges and is particularly adapted to be used in connection with oil or grease dispensers to accurately indicate the quantity of material passing therefrom. The invention is especially directed to an adjustable vernier for the gauge, which permits of its proper calibration to compensate for the air, oil, or other fluid contained in the material being dispensed as well as for other purposes.

Another object of the invention is to provide an efficient means for locking or sealing the instrument after it has been properly adjusted, in order that the adjustable parts may not be tampered with by irresponsible parties, thus assuring the delivery of an accurate quantity of the material to the purchaser.

The above and other objects of the invention will be more fully disclosed in the following specification and exemplified in the accompanying drawings, in which:

Figure 1 represents, in diagram, a section through a dispensing apparatus showing the invention applied thereto.

Figure 2 is a face view of the adjustable gauge.

Figure 3 is a vertical section through the same taken on the line 3—3 of Figure 2.

Figure 4 is a transverse section through the same taken on the line 4—4 of Figure 1.

Figure 5 is a detail of a modified form of an adjustable element forming a part of the gauge.

Referring to the accompanying drawings, and briefly stated, a certain type of dispensing apparatus comprises a tank 7, having a piston 8 mounted therein, and a rod 9 secured to said piston which projects outwardly through a gland at the top of the tank 7. The top part of the tank is provided with an inlet opening 10 and an outlet opening 11 and the bottom part of the tank is provided with an outlet opening 12. When the piston 8 is depressed as shown in Figure 1 the material passes from a source of supply and is sucked into the top part of the tank through the opening 10, the opening 11 being closed at this time. When it is desired to dispense a given quantity of this material the opening 10 is closed and the fluid under pressure is admitted through opening 11. A pointer 13 is adjustably secured on the outer end of the rod 9 and indicates on a gauge 14, which is secured to the tank 7, the quantity of material passing through opening 11.

During the sucking in, or filling operation of the tank the top part of the tank 7 is always completely filled with the material at each filling operation and as a certain amount of gas or air resides with the material it becomes necessary to recalibrate the gauge when filling the tank 7 with a different weight or density material due to the gas or air content thereof. As the material becomes compressed in the tank the rod 9 moves upwardly with the piston and the materials are dispensed from the tank, the pointer 13 always being set to start at zero 28$^a$.

After every dispensing operation ranging from the symbol 1 to 10 as indicated at 28, the rod 9 being elevated after each dispensing operation to a higher elevation by the piston 8 in regular succession, it will thus be necessary to set the pointer 13 opposite the pointer 20 at the zero symbol 28$^a$ after each dispensing operation, and the piston 8 with the pointer 13 may again be elevated to dispense the material as hereinbefore described.

In order to provide compensating means to meet the above recited contingency, the gauge 14 is constructed as follows: an upstanding plate 15 is secured at its lower end in any desired manner to the tank, as shown, and is arranged adjacent the pointer 13 on the rod 9.

The plate 15 is provided with a pair of vertically disposed slots 16 and 17 which are arranged opposite each other and in parallel relation. Mounted to slide in the slots 16 and 17 are a plurality of screws 18 and threaded on the ends of each of said screws is a nut 19 which bears against the face of the plate 15. Each nut 19 is provided with a pointer 20 which serves as a gauge indicator.

The nuts 19 are each provided with a flange 21 which rests against the outer edges of the plate 15 in order to prevent them from turning with respect to the plate and thus keeping the pointers in alignment.

By the above described arrangement it will be obvious that each nut may be independently adjusted vertically with respect to the plate and may be clamped tightly in such adjusted position, the plate being embraced between the heads of the screws at its back and the nuts at its face as clearly shown in the drawings.

In order that the screws 18 may not be tampered with after a desired adjustment of the nuts has been made a casing 22 is provided said casing being preferably formed of sheet metal and comprising a back portion 23 which covers the heads of screws 18, and the U shaped clips or edge portions 24 which engage with the opposite edges of the plate 15 and project over the face of the plate adjacent said edges.

By this arrangement the casing 22 may be slid onto the plate endwise to any desired position to cover the heads of screws 18 and locked in such a position by means of the seal or padlock 25 the wire portion of the seal passing through a perforation 26 in the casing and a perforation 27 in the plate 15.

Suitable symbols 28 may be affixed to the clip face of the casing 22 adjacent the nuts 19 indicating a unit of measure or weight as desired.

In Figure 5 a modified form of gauge indicator is shown, in this construction the pointers 20 are formed on a bar 29 which is designed to take the place of nuts 19 and to be adjustably secured to the plate 15 in a similar manner to that of the nuts.

By the above described construction it will be obvious that, upward pressure may be exerted on the material in the tank 7 until said material starts to exude through the opening 11, and then the lower nut 19 indicating zero may be adjusted to synchronize with the pointer 13 and the other nuts may be adjusted as desired to indicate the required quantity of material passing through the opening 11.

Having thus described my invention what I claim is:

1. In a gauge, a plate provided with a slot, a screw passing through said slot with the head of the screw engaging one side of the plate, an indicating pointer nut threaded on said screw and engaging the other side of said plate, and a flange on said pointer nut engaging one edge of said plate, in a manner which prevents rotation of said pointer nut during operation.

2. In a gauge, a plate provided with a slot, a screw passing through said slot with the head of the screw engaging one side of the plate, an indicating pointer nut threaded on said screw and engaging the other side of said plate, a flange on said pointer nut engaging one edge of said plate in a manner which prevents rotation of said pointer nut, a casing covering the head of said screw, and means for locking said casing to said plate.

3. In a gauge, the combination with an elongated plate provided with a pair of longitudinal slots, and a plurality of indicating nuts each of which has a pointer overlying the face of said plate and a flange underlying the back of said plate, said nuts being slideable along said slots; of a casing adapted to slide endwise over said plate and nuts, said casing having at each side a U-shaped portion which embraces said plate and nuts, said casing having a hole extending therethrough which alines with a hole in said plate when the casing is in its operative position, and a seal provided with locking means which extends through said hole.

In testimony whereof I hereunto affix my signature.

THEODORE E. HERLIHY.